United States Patent Office 2,874,099
Patented Feb. 17, 1959

2,874,099

STABILIZATION OF UNSATURATED ALDEHYDES

John W. Mecorney, Richmond Annex, Calif., assignor to Shell Development Company, New York, N. Y., a corporation of Delaware No Drawing. Application December 24, 1956
Serial No. 630,055

14 Claims. (Cl. 202—57)

This invention relates to the stabilization of unsaturated aliphatic aldehydes and relates more particularly to the stabilization of alpha-beta-unsaturated aliphatic aldehydes.

The unsaturated aliphatic aldehydes, such as for example, the alpha-beta-unsaturated aliphatic aldehydes are generally prone to undergo autopolymerization with the formation of products of a gummy or resinous character. The rate at which such materials are formed is often such as to present serious problems in the transportation, storage and/or processing of these aldehydic compounds. The presence of the products of autopolymerization not only results in a depreciation of the value of the material contaminated therewith but represents a material loss of valuable unsaturated aldehydes. At least a substantial part of the resinous materials thus formed are generally insoluble in the aldehydes from which they are derived and in solvents, such as hydrocarbon solvents, often employed in the processing of the unsaturated aldehydes. When the insoluble polymeric products settle out of the aldehydic materials containing them, the plugging of lines, heat exchangers, distillation apparatus, storage vessels, and the like, wherein the unsaturated aldehydes are found, often results.

Some suppression of the rate of autopolymerization is often attainable by the use of stabilizing agents disclosed heretofore. However, materials disclosed heretofore for this purpose have generally been unsatisfactory. Comprised in the factors contributing to the inadequacy of these materials are, for example, relative insolubility in the unsaturated aldehydes or mixture comprising the aldehydes, substantial absence of any appreciable vapor pressure under the conditions at which they are employed, thereby failing to inhibit or suppress the formation and deposition of gummy or polymeric deposits in the vapor spaces and parts accessible only with difficulty of the vessels, equipment, and the like, wherein the unsaturated aldehydes are encountered. Difficulties attributable to the formation of the high boiling materials heretofore have been especially severe at the elevated temperatures encountered when processing or treating the unsaturated aldehydes, particularly in the crude state or in the form of aqueous solutions.

In co-pending U. S. application Serial Number 630,056, filed December 24, 1956, it is disclosed and claimed that substantially improved inhibition of autopolymerization of the unsaturated aldehydes is attained by the use as stabilizing agent of nitric oxide (NO). The use of a normally gaseous material is, however, not always possible or equally desirable under every condition encountered in the transportation, storage and/or processing of the unsaturated aldehydes.

It has now been found that substantial improvement in the stabilization of unsaturated aliphatic aldehydes, comprising for example, the alpha-beta-unsaturated aliphatic aldehydes, during transportation, storage, and/or processing thereof, at normal or elevated conditions of temperature, is attained by effecting said transportation, storage, and/or processing of said aldehydes in the presence of a salt of nitrous acid with an organic nitrogen base. Examples of such suitable stabilizers are:

TABLE I

| compound | Vapor pressure, mm. Hg at 21° C. |
|---|---|
| 2-amino butane nitrite | .0038 |
| Cyclohexylamine nitrite | .0027 |
| Betaphenylethylamine nitrite | .0019 |
| 3,3,5-trimethylcyclohexylamine nitrite | .0018 |
| Morpholine nitrite | .0030 |
| 2,4,4,6-tetramethyl tetrahydro-3-oxazine nitrite | .0017 |
| Dicyclohexylamine nitrite | .00012 |
| Piperidine nitrite | .00057 |
| Dibenzylamine nitrite | .00087 |
| di-Isopropylamine nitrite | .0047 |
| Trimethylbenzyl ammonium nitrite | .00035 |

It is to be stressed that the compounds comprised in the broad class of suitable stabilizing agents are not necessarily equivalent for the purpose of the invention. Because of their effectiveness the nitrite salts of the secondary amines are generally preferred and of these the salts wherein the amine residue contains from about two to about sixteen carbon atoms. Preferred members of this group are the dialkyl ammonium nitrites represented by the general formula

$$\begin{array}{c} R \diagdown \diagup R \\ NH \\ \cdot \\ HNO_2 \end{array} \quad (I)$$

wherein each R is the same or a different alkyl or cycloalkyl group. Examples of such suitable dialkyl ammonium nitrites comprise the nitrite salts of such dialkyl amines as: dimethylamine, diethylamine, dipropylamine, diisopropylamine, diamylamine, dioctylamine, dicyclohexylamine, N-methylcyclohexylamine, and the various homologs and analogs of these specific dialkylamines.

Of these compounds the di-secondary alkyl amine nitrites, that is, the nitrite salts of secondary amines represented by the foregoing Formula I wherein each R is alkyl or cycloalkyl, linked to the amino nitrogen atom through a secondary carbon atom are particularly preferred. Examples of such particularly preferred di-sec-alkylamine nitrite stabilizing agents comprise, for example, diisopropyl aminenitrite, dicyclohexylamine nitrite, etc. A compound particularly suitable because of its effectiveness as a stabilizer in addition to properties which render it particularly desirable such as relatively high vapor pressure, high stability, appreciable solubility in the unsaturated aldehydes and hydrocarbon solvents, etc., is dicyclohexylamine nitrite.

The invention is applied broadly to the stabilization during storage, transportation and/or processing, at ordinary and/or elevated temperatures, of the unsaturated aliphatic aldehydes. It is applied with advantage to the stabilization of the alpha,beta-unsaturated aliphatic aldehydes such as, for example, acrolein, methacrolein, etc., regardless of their source or origin. Comprised within the alpha,beta-unsaturated aliphatic aldehydes thus stabilized within the scope of the invention are the homologs of acrolein comprising those wherein at least one of the hydrogen atoms attached to the alpha or beta carbon atom of acrolein is replaced by an alkyl group such as, for example, methyl, ethyl, propyl, butyl, amyl, etc. The invention is of particular value in the stabilization of the crude aliphatic aldehydes as obtained, for example, by controlled catalytic oxidation of corresponding olefinic hydrocarbons. Comprised within the aldehydes stabilized in accordance with the invention are aqueous solutions of the crude aldehydes obtained, for example, by the absorption of olefin oxidation products comprising the unsaturated aldehydes with aqueous solvents.

Processing conducted at elevated temperatures during the course of which the aliphatic aldehydes are stabilized in accordance with the invention, comprise any of the steps to which the aldehydes in crude or refined state, aqueous solutions thereof, mixture comprising them, etc., are normally subjected during the processing or treating thereof. Such processing may comprise one or more such steps, as for example, distillation, solvent extraction, extractive distillation, heat exchange, condensation, heating, stratification, filtering, etc.

The invention is not limited to any specific method of introducing the stabilizer into the aliphatic unsaturated aldehyde to be stabilized. The stabilizer, or a suitable solution thereof, may be added to the aldehyde while the latter is in the liquid phase at ordinary or elevated temperatures. The stabilizer may be added to the aldehyde before, during or after a processing or treating thereof. The stabilizer introduced into equipment or vessels wherein the aliphatic aldehyde to be stabilized is contained, may be injected into one or more parts thereof. In a preferred method of incorporating the stabilizer into an unsaturated aldehyde, such as, for example, acrolein, it is introduced prior to formation of precursors of the autopolymerization products. This is generally accomplished by adding the stabilizer to the crude aldehyde, or by introducing it into the equipment wherein such crude acrolein is to be processed or treated. Without intent to limit in any wise the scope of the present invention by theory advanced herein to set forth more fully the nature of the invention, it is believed that precursors leading to subsequent formation of resinous materials during storage may well be formed during the processing of the unsaturated aliphatic aldehyde at elevated temperatures.

The amount of stabilizer added to the aliphatic aldehyde to accomplish the desired degree of stabilization may vary considerably within the scope of the invention. In general, the stabilizer is employed in an amount ranging, for example, from about 0.01 to about 1% by weight, based upon aliphatic aldehyde present. In general, amounts from about 0.05 to about 0.5% by weight, based upon aliphatic aldehyde, will be found satisfactory. Greater or lesser amounts of the stabilizer may, however, be employed within the scope of the invention. During the processing of acrolein in continuous systems the continuous, or intermittent, introduction of the stabilizer into one or more parts of the system may be resorted to within the scope of the invention.

The effectiveness of the salts of nitrous acid with an organic nitrogen base in stabilizing the unsaturated aliphatic aldehydes during conditions of transportation and/or storage is illustrated by the following example.

Example I

Acrolein, obtained by catalytic oxidation of propylene, purified by flash distillation and dried over anhydrous calcium sulfate, was placed in a glass container, sealed and stored at room temperature. The operation was twice repeated under substantially identical conditions but with the exception that to one of the samples there was added diisopropyl amine nitrite and to the other dicyclohexylamine nitrite. In eight additional operations separate samples of the same batch of acrolein were again stored under substantially identical conditions but with the exception that to each there was added a different additive, the identity of which is indicated in the following Table A.

All of the additives were added to the sample in an amount resulting in 0.1% by weight of the additive based on acrolein. Storage of these samples was continued until evidence of a clouding of the acrolein became apparent by visual observation. The time elapsed from initiating the storage to the time of such initial clouding was recorded for each sample. Results obtained are set forth in the following Table A.

TABLE A

| Sample No. | Additive | Cloud Time |
|---|---|---|
| 1 | None | 2 hrs. |
| 2 | Diisopropylaminenitrite | 9 days. |
| 3 | Dicyclohexylaminenitrite | Do. |
| 4 | Hydroquinone | 2 days. |
| 5 | p-Aminoazobenzene | 6 hrs. |
| 6 | N,N'-di-sec-butyl-p-phenylenediamine | Do. |
| 7 | D-Naphthylthiourea | Do. |
| 8 | Hydrazine hydrate | 45 hrs. |
| 9 | m-Nitrosodiphenylamine | 18 hrs. |
| 10 | Nitrobenzene | 1.5 hrs. |
| 11 | n-Butyl nitrite | 0.67 hrs. |

A particular advantage of the nitrite stabilizers of the present invention resides in their ability to suppress substantially completely the formation of polymeric products which are relatively insoluble in the unsaturated aldehydes. The polymeric material which ultimately is formed after prolonged periods of storage in the presence of the stabilizers of the present invention generally consists substantially exclusively of soluble material, material which does not seriously interfere with handling, processing, and/or treating of the aldehyde containing it. The effectiveness of the nitrite stabilizers of the invention in suppressing the formation of insoluble polymeric material is present even at substantially elevated conditions of temperature as evidenced by the following example.

Example II

Acrolein, obtained by catalytic oxidation of propylene, purified by flash distillation and dried over calcium sulfate, was placed in a glass container. The container was sealed and stored at a constant temperature of 100° C. until a clouding of the sample became evident by visual observation. The operation was repeated with separate samples of the same batch of acrolein under substantially identical storage conditions but with the exception that an additive, identified in the following Table B, was added to each of the samples. When initial clouding of the sample became apparent the amount of insoluble polymer therein was determined. The division of this amount by the period of storage, in days, results in the average rate of insoluble polymer formation in percent by weight of the acrolein per day of storage. Results obtained in terms of the length of storage to initial clouding and in average rate of insoluble polymer formation, for each of the samples are set forth in the following Table B.

TABLE B

| Sample No. | Additive | Cloud time | Insoluble polymer formation rate, percent w./day |
|---|---|---|---|
| 20 | None | 15 min | 50 |
| 21 | Dicyclohexylaminenitrite | 14 hrs | 0 |
| 22 | Diisopropylaminenitrite | 5 days | 0 |
| 23 | Hydroquinone | 6 hrs | 1.4 to 5 |
| 24 | Diphenylamine | 1 hr | 25 |
| 25 | N,N'-di-sec.butyl-p-phenylenediamine | Mild explosion | |

Comprised within the scope of the invention is the use of the nitrite stabilizers in combination with other agents capable of suppressing to some extent the formation of gums, or other resinous materials, in the unsaturated aldehyde during transportation, storage and/or processing thereof. Such additional agents which may be employed in combination with the nitrite stabilizers comprise, for example, nitric oxide, phenolic type of antioxidants such as hydroquinone, 2,6-di-tertbutyl-4-methyl phenol, etc. A combination of additives particularly effective in the processing of the unsaturated aliphatic aldehydes at elevated temperatures is the combination of one or more of the nitrite additives with nitric oxide.

I claim as my invention:

1. The method of stabilizing an alpha,beta-unsaturated aliphatic aldehyde which comprises incorporating therein a salt of nitrous acid with an organic nitrogen base.

2. The method of stabilizing an alpha,beta-unsaturated aliphatic aldehyde which comprises incorporating therewith from about 0.01 to about 1% by weight based on said alpha,beta-unsaturated aldehyde of a nitrite salt of a secondary amine.

3. The method of improving the stability of an alpha,beta-unsaturated aliphatic aldehyde which comprises adding from about 0.01 to about 1% by weight based on said alpha,beta-unsaturated aldehyde of a di-alkylamine nitrite thereto.

4. The method of improving the stability of an alpha,beta-unsaturated aliphatic aldehyde which comprises adding thereto from about 0.01 to about 1% by weight of a di-secondary alkylamine nitrite.

5. The method in accordance with claim 4 wherein said alpha,beta-unsaturated aliphatic aldehyde is acrolein.

6. The method in accordance with claim 5 wherein said di-secondary alkylamine nitrite is present in an amount ranging from about 0.05 to about 0.5% by weight.

7. The method in accordance with claim 5 wherein said di-secondary alkylamine nitrite is di-isopropylamine nitrite.

8. The method in accordance with claim 5 wherein said di-secondary alkylamine nitrite is di-cyclohexylamine nitrite.

9. The method of stabilizing an alpha,beta-unsaturated aliphatic aldehyde during non-reactive processing thereof which comprises adding to said alpha,beta-unsaturated aliphatic aldehyde a dialkylamine nitrite.

10. The method of stabilizing an alpha,beta-unsaturated aliphatic aldehyde during distillation which comprises adding to said alpha,beta-unsaturated aldehyde a di-secondary alkylamine nitrite.

11. The method in accordance with claim 10 wherein said alpha,beta-unsaturated aliphatic aldehyde is acrolein.

12. The method in accordance with claim 11 wherein said di-secondary alkylamine nitrite is added in an amount ranging from about 0.01 to about 1% by weight based on the acrolein.

13. The method in accordance with claim 11 wherein said di-secondary alkylamine nitrite is diisopropylamine nitrite.

14. The method in accordance with claim 11 wherein said di-secondary alkylamine nitrite is dicyclohexylamine nitrite.

References Cited in the file of this patent

UNITED STATES PATENTS

| | | |
|---|---|---|
| 2,212,894 | Allen | Aug. 27, 1940 |
| 2,643,178 | Wachter et al. | June 23, 1953 |
| 2,767,178 | Mellick | Oct. 16, 1956 |